(12) United States Patent
Xing et al.

(10) Patent No.: US 11,873,248 B2
(45) Date of Patent: Jan. 16, 2024

(54) MODIFIED NIO-TA$_2$O$_5$-BASED MICROWAVE DIELECTRIC CERAMIC MATERIAL SINTERED AT LOW TEMPERATURE AND ITS PREPARATION METHOD

(71) Applicant: Yangtze Delta Region Institute of University of Electronic Science and Technology of China, Huzhou, Huzhou (CN)

(72) Inventors: MengJiang Xing, Kunming (CN); XiaoZhen Li, Huzhou (CN); HongYu Yang, Xi'an (CN); MingShan Qu, Chengdu (CN)

(73) Assignee: Yangtze Delta Region Institute of University of Electronic Science and Technology of China, Huzhou, Huzhou (CN)

( * ) Notice: Subject to any disclaimer, the term of this patent is extended or adjusted under 35 U.S.C. 154(b) by 0 days.

(21) Appl. No.: 17/979,846

(22) Filed: Nov. 3, 2022

(65) Prior Publication Data

US 2023/0145935 A1 May 11, 2023

(30) Foreign Application Priority Data

Nov. 3, 2021 (CN) .......................... 202111292700.9

(51) Int. Cl.
*C04B 35/495* (2006.01)
*C04B 35/626* (2006.01)
*C04B 35/64* (2006.01)

(52) U.S. Cl.
CPC ........ *C04B 35/495* (2013.01); *C04B 35/6261* (2013.01); *C04B 35/62655* (2013.01);
(Continued)

(58) Field of Classification Search
None
See application file for complete search history.

(56) References Cited

U.S. PATENT DOCUMENTS

| 3,920,781 | A | * | 11/1975 | Eror | ...................... | H01G 4/1227 |
| | | | | | | 361/321.5 |
| 6,242,375 | B1 | * | 6/2001 | Hong | ................... | H01G 4/1209 |
| | | | | | | 501/134 |

(Continued)

FOREIGN PATENT DOCUMENTS

| CN | 109251029 A | 1/2019 |
| CN | 109574663 A | 4/2019 |

(Continued)

OTHER PUBLICATIONS

CNIPA, Notification of a First Office Action for CN202111292700.9, dated Jun. 15, 2022.
(Continued)

*Primary Examiner* — John J Figueroa
(74) *Attorney, Agent, or Firm* — Zhigang Ma

(57) ABSTRACT

The invention belongs to the field of electronic ceramics and its manufacturing, in particular to the modified NiO—Ta$_2$O$_5$-based microwave dielectric ceramic material sintered at low temperature and its preparation method. It is guided by ion doping modification, not only considering the substitution of ions with similar radius, such as $Zn^{2+}$ replacing $Ni^{2+}$ ions, $V^{5+}$ replacing $Ta^{5+}$ ions; Meanwhile, the selected doped oxide still has the property of low melting point. Therefore, the microwave dielectric properties of NiO—Ta$_2$O$_5$-based ceramic material can be improved and the appropriate sintering temperature can be reduced. In the invention, by adjusting the molar content of each raw material, the NiO—Ta$_2$O$_5$-based ceramic material with low-temperature sintering, stable temperature and excellent (Continued)

microwave dielectric property is directly synthesized at one time, which can be widely applied to the technical field of LTCC.

3 Claims, 2 Drawing Sheets

(52) U.S. Cl.
CPC ........ *C04B 35/62675* (2013.01); *C04B 35/64* (2013.01); *C04B 2235/3251* (2013.01); *C04B 2235/3279* (2013.01); *C04B 2235/604* (2013.01); *C04B 2235/96* (2013.01)

(56) References Cited

U.S. PATENT DOCUMENTS

| | | | | |
|---|---|---|---|---|
| 6,316,376 | B1* | 11/2001 | Hong | .................... C04B 35/499 501/137 |
| 6,620,750 | B2* | 9/2003 | Kim | ........................ B32B 18/00 264/618 |
| 6,794,324 | B1* | 9/2004 | Kim | ..................... H01G 4/1218 361/321.5 |
| 8,841,226 | B2* | 9/2014 | Masaoka | ............... C04B 35/468 501/122 |
| 2002/0045532 | A1* | 4/2002 | Okawa | ..................... H01P 7/10 501/136 |
| 2020/0027659 | A1* | 1/2020 | Jung | ........................ H01G 4/30 |
| 2020/0189980 | A1 | 6/2020 | Li | |
| 2020/0381179 | A1* | 12/2020 | Yoon | ........................ H01G 4/30 |
| 2022/0238277 | A1* | 7/2022 | Guo | ........................ H01G 4/30 |

FOREIGN PATENT DOCUMENTS

| | | |
|---|---|---|
| CN | 110596217 A | 12/2019 |
| CN | 113105237 A | 7/2021 |

OTHER PUBLICATIONS

University of Electronic Science and Technology (Applicant), Reply to Notification of a First Office Action for CN202111292700.9, w/ (allowed) replacement claims, dated Oct. 25, 2022.

CNIPA, Notification to grant patent right for invention in CN202111292700.9, dated Nov. 7, 2022.

\* cited by examiner

MODIFIED NIO-TA$_2$O$_5$-BASED MICROWAVE DIELECTRIC CERAMIC MATERIAL SINTERED AT LOW TEMPERATURE AND ITS PREPARATION METHOD

TECHNICAL FIELD

The present invention belongs to the field of electronic ceramics and its manufacturing, and relates to a modified NiO—Ta$_2$O$_5$-based microwave dielectric ceramic material sintered at low temperature and its preparation method.

BACKGROUND

With the development of mobile communication in the direction of high frequency, the importance of electronic components such as dielectric filters, dielectric resonator antennas, dielectric waveguides, etc. is highlighted, while microwave dielectric ceramics can play a functional role in the range of 300 MHz-300 GHz, and are the key basic materials widely used to prepare the above electronic components at present.

Traditional microwave equipment is heavy and expensive. With the development of communication industry, it is required that the space occupied by circuit system should be as small as possible. As a new type of three-dimensional integrated packaging and interconnection technology, low-temperature co-fired ceramic(LTCC) technology provides a reliable solution for preparing ceramic modules or integrated circuits with embedded electrodes because of it can meet the high-frequency application. Therefore, developing ceramic systems applied to LTCC technology has become the focus of research in this field.

The microwave dielectric properties of NiO—Ta$_2$O$_5$ ceramic material with tetragonal Tri-rutile crystal structure at 1400° C. are: $\varepsilon_r$=25, Q×f=31200 GHz, T$_f$=26 ppm/° C., but it can't be co-fired with Ag or Cu electrodes in LTCC technology due to too high sintering temperature (co-firing with Ag electrodes should not exceed 950° C.; Co-firing with Cu electrode should not exceed 1000° C. and be carried out in reducing atmosphere), and the temperature coefficient T$_f$ of resonance frequency is also large (T$_f$ value between 10 ppm/° C. means excellent temperature stability). Up to now, there is no exploration of low-temperature sintering of NiO—Ta$_2$O$_5$ ceramics. Therefore, it is urgent to reduce the sintering temperature of NiO—Ta$_2$O$_5$-basedceramics and maintain the microwave dielectric properties.

SUMMARY

In view of the above problems or deficiencies, in order to solve the problem that the existing NiO—Ta$_2$O$_5$ ceramics can't be co-fired with Ag or Cu electrodes in LTCC technology due to high sintering temperature, the present invention provides a low-temperature sintering modified NiO—Ta$_2$O$_5$-based microwave dielectric ceramic material and its preparation method, which realizes low-temperature sintering while maintaining excellent microwave dielectric properties. Its temperature is stable, and it can be widely used in LTCC technical field.

The invention provides a modified NiO—Ta$_2$O$_5$-based microwave dielectric ceramic material sintered at low temperature, and the general chemical formula of it is:

(1.587y-0.198xy)ZnO-(2.597y-0.324xy)CuO-(1-x)NiO-(1.855y-0.231xy)B$_2$O$_3$-3xSnO$_2$-(1-x)Ta$_2$O$_5$-(0.284y-0.035xy)V$_2$O$_5$; wherein 0.1.5≤x≤0.2; and 0.03≤y≤0.09; and prepared by solid-phase method; and the crystal type is NiTa$_2$O$_6$ structure;

the sintering temperature of the microwave dielectric ceramic material is 875-950° C., and the microwave dielectric ceramic material is pre-sintered in the atmosphere environment of 850-900° C.; in addition, the dielectric constant is 17~21, the quality factor Q×f value is 14,000-23,000 GHz, and the temperature coefficient of resonance frequency is 5~10 ppm/° C.

Preferably, when x=0.15 and y=0.06, the dielectric constant of the material is 20.2 at the sintering temperature of 925° C., the quality factor Q×f value is 22417 GHz, and the temperature coefficient of resonant frequency is 8.7 ppm/° C., which can be used in the LTCC technical field.

The preparation method of the modified NiO—Ta$_2$O$_5$-based microwave dielectric ceramic material sintered at low temperature comprises the following steps:

step 1, mix ZnO, CuO, NiO, B$_2$O$_3$, SnO$_2$, Ta$_2$O$_5$ and V$_2$O$_5$ powder according to the general chemical formula: (1.587y-0.198xy)ZnO-(2.597y-0.324xy)CuO-(1-x)NiO-(1.855y-0.231xy)B$_2$O$_3$-3xSnO$_2$-(1-x)Ta$_2$O$_5$-(0.284y-0.035xy)V$_2$O$_5$;(x=0.1~0.2y=0.03~0.09);

step 2: put the powder mixed in step 1 into a ball milling tank, and perform ball milling with zirconia balls and deionized water according to the mass ratio of powder: zirconia balls:deionized water of 1:5-7:3-5, perform the planetary ball milling for 6-8 hours, take it out, dry it in an oven at 80-120° C., sieve it with a 40-60 mesh sieve, and pre-sinter it in an atmosphere environment environment at 850-900° C. for 3~5 hours;

step 3: perform ball milling on the powder pre-sintered in step 2 again according to the mass ratio of powder:zirconium balls:deionized water of 1:4-6:1-3, and perform planetary ball milling and mixing for 3-6 hours, take it out and dry, and add polyvinyl alcohol solution into the obtained powder for granulation;

step 4, press and mold the ceramic raw material prepared in step 3, discharge the glue at 600-650° C., and then sinter in the atmosphere environment environment at 875-950° C. for 4-6 hours to obtain the modified NiO—Ta$_2$O$_5$-based microwave dielectric ceramic material sintered at low temperature.

The invention is different from the technology reported in the prior field, that is, by adding oxides such as CuO, V$_2$O$_5$, B$_2$O$_3$ and the like into the pre-sintered NiO—Ta$_2$O$_5$ material as sintering aids, the purpose of sintering into ceramic at low-temperature is achieved under the action of liquid phase. Instead, it is guided by ion doping modification, which not only takes into account the substitution of ions with similar radius to realize the preparation of solid solution ceramics, such as Zn$^{2+}$ replacing Ni$^{2+}$ ions, V$^{5+}$ replacing Ta$^{5+}$ ions, and (Ni⅓Ta⅔)$^{4+}$ composite ions being replaced by Sn4+, and the synergistic effect among different ions can improve the comprehensive microwave dielectric properties; At the same time, the selected doped oxide still has the property of low melting point, so the purpose of improving the main crystalline phase of NiO—Ta$_2$O$_5$ synthesized at a lower temperature can be achieved, and the sintering temperature can be reduced while the ceramic material maintains excellent microwave dielectric properties.

The present invention provides a modified NiO—Ta$_2$O$_5$-based ceramic material sintered at low temperature, and its chemical general formula is (1.587y-0.198xy)ZnO-(20.597y-0.324xy)CuO-(1-x)NiO-(1.855y-0.231xy)B$_2$O$_3$-3xSnO$_2$-(1-x)Ta$_2$O$_5$-(0.284y-0.035xy)V$_2$O$_5$. By adjusting the molar content of each raw material, the NiO—$Ta_2O_5$-based ceramic material with low-temperature sintering, stable temperature and excellent microwave dielectric properties is directly synthesized at one time, which can be widely used in LTCC technical field.

DETAILED DESCRIPTION OF THE INVENTION

The present invention will be further explained in detail below with reference to the figures and embodiments.

step 1, mix ZnO, CuO, NiO, $B_2O_3$, $SnO_2$, $Ta_2O_5$ and $V_2O_5$ powder in molar ratio according to the general chemical formula:

(1.587y-0.198xy)ZnO-(2.597y-0.324xy)CuO-(1-x)NiO-(1.855y-0.231xy)$B_2O_3$-3 $xSnO_2$-(1-x)$Ta_2O_5$-(0.284y-0.035xy)$V_2O_5$;(x=0.1~0.2y=0.03~0.09);

step 2, put the powder weighted in step 1 into a ball milling tank, and perform planetary ball milling with zirconia balls and deionized water according to the mass ratio of powder:zirconia balls:deionized water of 1:6:3 for 6 hours, take it out, dry it in an oven at 100° C., sieve it with a 60 mesh sieve, and pre-sinter it in an atmosphere environment environment at 900° C. for 3 hours;

step 3, perform the second ball milling on the pre-sintered powder, and perform planetary ball milling according to the mass ratio of powder:zirconia balls:deionized water of 1:6:2, for 4 hours, take it out and dry, and add polyvinyl alcohol solution into the obtained powder for granulation;

step 4, put the granulated powder into a mold of φ12 and form it into a cylinder by dry-pressing under pressure of 20 MPa. Then, keep the cylinder block at 650° C. for 2 hours to remove the binder, and then raise it to 875° C.~950° C. for 4 hours. Finally, the modified NiO—$Ta_2O_5$-based microwave dielectric ceramic material under the condition of low-temperature sintering is prepared. The molar ratios of its chemical formulas are: ZnO—CuO—NiO—$B_2O_3$—$SnO_2$—$Ta_2O_5$—$V_2O_5$(3.7:6.1:33.7:4.3:17.8:33.7:0.7 mol %).

Figure 1:
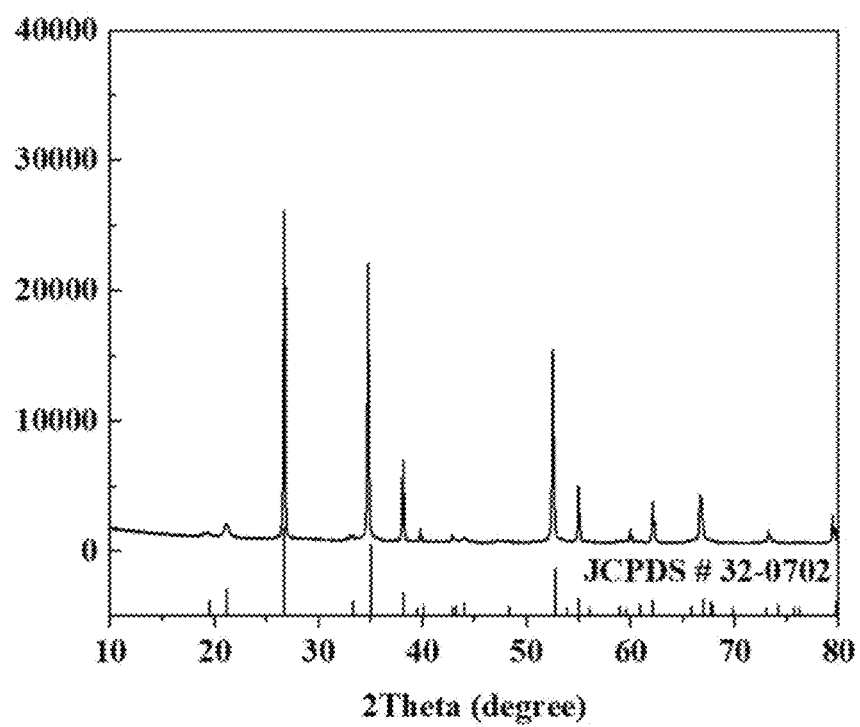
FIG. 1 shows X-ray diffraction (XRD) pattern of ceramic sample corresponding to embodiment 3.

In order to better illustrate the effect of the present invention, four embodiments are made according to the above steps. FIG. 1 shows the X-ray diffraction (XRD) pattern of ceramic sample corresponding to embodiment 3. After searching, the phase composition of ceramics corresponds to the standard card JCPDS card No. 32-0702 of $NiTa_2O_6$. At this time, no second phase diffraction peak is found in the system, which means that this type of ceramics belongs to the solid solution with $NiTa_2O_6$ structure.

Figure 2:
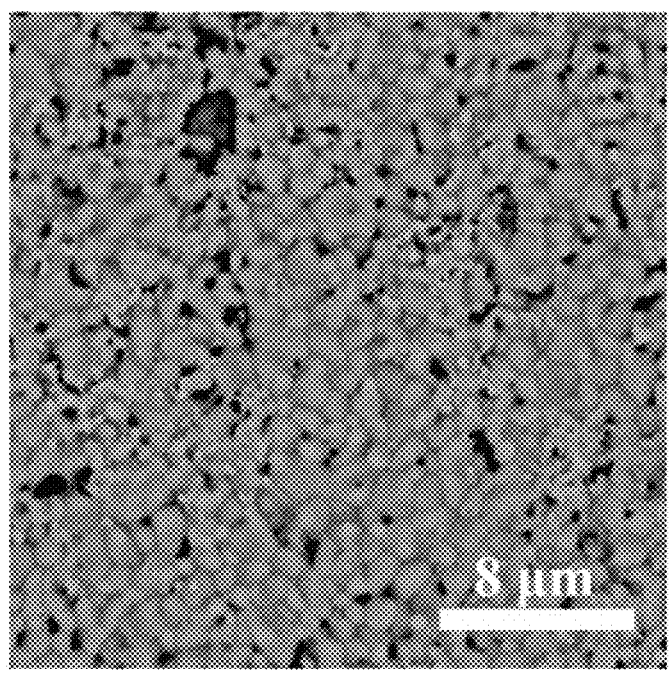
FIG. 2 shows a morphology diagram of the ceramic sample corresponding to the embodiment 3 under a scanning electron microscope (SEM).

FIG. 2 is the morphology diagram of the ceramic sample corresponding to the embodiment 3 under a scanning electron microscope (SEM). It can be seen that the grain growth of the ceramic sample is sufficient, and the grain boundary is clearly visible, indicating that its low-temperature sintering characteristics are good, but the microscopic pores still exist at this time.

Components and microwave dielectric properties of each embodiment are as follows:

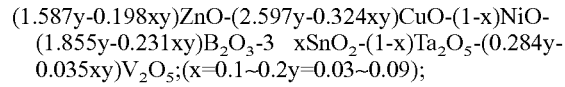

| Embodiment | Mass of each component/g | | | | | | | Sintering temperature (° C.) |
| --- | --- | --- | --- | --- | --- | --- | --- | --- |
|  | ZnO | CuO | NiO | $B_2O_3$ | $SnO_2$ | $Ta_2O_5$ | $V_2O_5$ |  |
| 1 | 1.415 | 2.264 | 11.816 | 1.415 | 12.621 | 69.903 | 0.566 | 875 |
| 2 | 1.415 | 2.264 | 11.816 | 1.415 | 12.621 | 69.903 | 0.566 | 900 |
| 3 | 1.415 | 2.264 | 11.816 | 1.415 | 12.621 | 69.903 | 0.566 | 925 |
| 4 | 1.415 | 2.264 | 11.816 | 1.415 | 12.621 | 69.903 | 0.566 | 950 |

Table 1 shows the components of the sample groups of each embodiment.

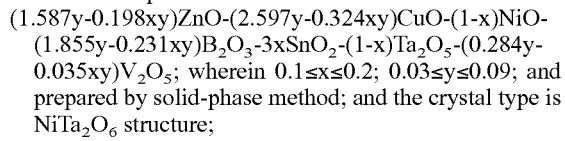

| Embodiment | External diameter (mm) | Thickness (mm) | Dielectric coefficient $\varepsilon_r$ | $Tan\delta$ ($10^{-4}$) | $Q \times f$ (GHz) | $\tau_f$ |
| --- | --- | --- | --- | --- | --- | --- |
| 1 | 10.89 | 4.45 | 17.7 | 6.7 | 14290 | 7.4 |
| 2 | 10.61 | 4.32 | 19.5 | 5.3 | 18140 | 8.1 |
| 3 | 10.42 | 4.16 | 20.2 | 4.1 | 22417 | 8.7 |
| 4 | 10.35 | 4.18 | 19.7 | 4.3 | 21415 | 8.3 |

Table 2 shows the microwave dielectric properties of the samples of each embodiment.

From the data shown in Table 1 and Table 2, it can be seen that when x=0.15 and y=0.06, the sintering temperature is in the range of 875-925° C., the dielectric constant and Q×f value of modified NiO—$Ta_2O_5$-based ceramic materials first increase and then decrease, and the best values are obtained at 925° C.: $\varepsilon_r$=20.2, $tan\delta$=4.1×$10^{-4}$, Q×F=22417 GHz, $T_f$=8.7 ppm/° C. And compared with the existing literature reports, the sintering temperature is greatly reduced, while excellent temperature stability and microwave dielectric properties are maintained, which can be widely used in LTCC technical field.

What is claimed is:

1. A modified NiO—$Ta_2O_5$-based microwave dielectric ceramic material sintered at low temperature is characterized in that the general chemical formula of the modified NiO—$Ta_2O_5$-based microwave dielectric ceramic material sintered at low temperature is:

(1.587y-0.198xy)ZnO-(2.597y-0.324xy)CuO-(1-x)NiO-(1.855y-0.231xy)$B_2O_3$-3x$SnO_2$-(1-x)$Ta_2O_5$-(0.284y-0.035xy)$V_2O_5$; wherein 0.1≤x≤0.2; 0.03≤y≤0.09; and prepared by solid-phase method; and the crystal type is $NiTa_2O_6$ structure;

the sintering temperature of the microwave dielectric ceramic material is 875-950° C., and the microwave dielectric ceramic material is pre-sintered in the atmosphere environment of 850-900° C.; in addition, the dielectric constant is 17~21, the quality factor Q×f value is 14,000~23,000 GHz, and the temperature coefficient of resonance frequency is 5~10 ppm/° C.

2. The modified NiO—$Ta_2O_5$-based microwave dielectric ceramic material sintered at low temperature according to claim 1 is characterized in that when x=0.15 and y=0.06, the dielectric constant of the material is 20.2 at the sintering temperature of 925° C., the quality factor Q×f value is 22417 GHz, and the temperature coefficient of resonant frequency is 8.7 ppm/° C.

3. A preparation method of a modified $NiO-Ta_2O_5$-based microwave dielectric ceramic material sintered at low temperature is characterized in that it comprises the following steps:

step 1, mixing ZnO, CuO, NiO, $B_2O_3$, $SnO_2$, $Ta_2O_5$ and $V_2O_5$ powder according to the general chemical formula: $(1.587y-0.198xy)ZnO-(2.597y-0.035xy)V_2O_5$; $(x-0.10.2y-0.030.09)$, wherein $0.1 \leq x \leq 0.2$; $0.03 \leq y \leq 0.09$;

step 2, putting the powder mixed in step 1 into a ball milling tank, and performing ball milling with zirconia balls and deionized water according to a mass ratio of powder:zirconia balls:deionized water of 1:5-7:3-5, performing the planetary ball milling for 6-8 hours, taking it out, drying it in an oven at 80-120° C., sieving it with a 40-60 mesh sieve, and pre-sintering it in an atmosphere environment at 850-900° C. for 3~5 hours;

step 3, performing ball milling on the powder pre-sintered in step 2 again according to a mass ratio of powder: zirconium balls:deionized water of 1:4-6:1-3, and performing planetary ball milling and mixing for 3-6 hours, taking it out and drying, and adding polyvinyl alcohol solution into the obtained powder for granulation;

step 4, pressing and molding the ceramic raw material prepared in step 3, discharging the glue at 600-650° C., and then sintering in the atmosphere environment at 875-950° C. for 4-6 hours to obtain the modified $NiO-Ta_2O_5$-based microwave dielectric ceramic material sintered at low temperature.

* * * * *